(12) United States Patent
Landis et al.

(10) Patent No.: US 11,611,895 B2
(45) Date of Patent: Mar. 21, 2023

(54) REFERENCE SIGNALS FOR POWER AMPLIFIER COMPRESSION MEASUREMENTS

(71) Applicant: QUALCOMM Incorporated, San Diego, CA (US)

(72) Inventors: Shay Landis, Hod Hasharon (IL); Gideon Shlomo Kutz, Ramat Hasharon (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/211,587

(22) Filed: Mar. 24, 2021

(65) Prior Publication Data

US 2022/0312244 A1    Sep. 29, 2022

(51) Int. Cl.
| | |
|---|---|
| *H04W 24/10* | (2009.01) |
| *H04B 17/10* | (2015.01) |
| *H04B 17/13* | (2015.01) |
| *H04B 7/0456* | (2017.01) |
| *H04B 7/06* | (2006.01) |

(52) U.S. Cl.
CPC .......... *H04W 24/10* (2013.01); *H04B 7/0465* (2013.01); *H04B 7/0486* (2013.01); *H04B 7/0632* (2013.01); *H04B 7/0639* (2013.01); *H04B 17/102* (2015.01); *H04B 17/13* (2015.01)

(58) Field of Classification Search
CPC ... H04W 24/10; H04B 7/0465; H04B 7/0486; H04B 7/0632; H04B 7/0639; H04B 17/102; H04B 17/13
See application file for complete search history.

(56) References Cited

U.S. PATENT DOCUMENTS

| | | | | |
|---|---|---|---|---|
| 5,731,993 | A * | 3/1998 | Wachs | H04B 17/309 |
| | | | | 702/90 |
| 2011/0102080 | A1 * | 5/2011 | Chatterjee | H03F 3/193 |
| | | | | 330/149 |
| 2019/0190552 | A1 | 6/2019 | Sagi et al. | |

FOREIGN PATENT DOCUMENTS

| | | | | |
|---|---|---|---|---|
| CA | 2765844 A1 * | 12/2010 | | H04B 7/024 |
| WO | WO-2019190551 A1 * | 10/2019 | | H04B 1/04 |
| WO | WO-2021046654 A1 * | 3/2021 | | H03F 1/0261 |

OTHER PUBLICATIONS

International Search Report and Written Opinion—PCT/US2022/070676—ISA/EPO—dated May 20, 2022.

* cited by examiner

*Primary Examiner* — Jean B Corrielus
(74) *Attorney, Agent, or Firm* — Harrity & Harrity, LLP

(57) ABSTRACT

Various aspects of the present disclosure generally relate to wireless communication. In some aspects, a mobile station may receive a set of reference signals having different levels of power amplifier compression. The mobile station may transmit a measurement report based at least in part on measurements of the set of reference signals. Numerous other aspects are described.

30 Claims, 8 Drawing Sheets

REFERENCE SIGNALS FOR POWER AMPLIFIER COMPRESSION MEASUREMENTS

FIELD OF THE DISCLOSURE

Aspects of the present disclosure generally relate to wireless communication and to techniques and apparatuses for reference signals for power amplifier compression measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of mobile stations (e.g., user equipment (UE)). A mobile station may communicate with a BS via the downlink and uplink. "Downlink" (or "forward link") refers to the communication link from the BS to the mobile station, and "uplink" (or "reverse link") refers to the communication link from the mobile station to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes receiving, by the mobile station, a set of reference signals having different levels of power amplifier compression; and transmitting, by the mobile station, a measurement report based at least in part on measurements of the set of reference signals.

In some aspects, a method of wireless communication performed by a base station includes transmitting, by the base station, a set of reference signals having different levels of power amplifier compression; and receiving, by the base station, a measurement report based at least in part on measurements of the set of reference signals.

In some aspects, a mobile station for wireless communication includes a memory and one or more processors, coupled to the memory, configured to: receive a set of reference signals having different levels of power amplifier compression; and transmit a measurement report based at least in part on measurements of the set of reference signals.

In some aspects, the indication of the one or more candidate levels of amplifier compression includes: an indication of one or more reference signals of the set of reference signals having levels of power amplifier compression that are preferred for one or more downlink communications.

In some aspects, a base station for wireless communication includes a memory and one or more processors, coupled to the memory, configured to: transmit a set of reference signals having different levels of power amplifier compression; and receive a measurement report based at least in part on measurements of the set of reference signals.

In some aspects, a non-transitory computer-readable medium storing a set of instructions for wireless communication includes one or more instructions that, when executed by one or more processors of a mobile station, cause the mobile station to: receive a set of reference signals having different levels of power amplifier compression; and transmit a measurement report based at least in part on measurements of the set of reference signals.

In some aspects, a non-transitory computer-readable medium storing a set of instructions for wireless communication includes one or more instructions that, when executed by one or more processors of a base station, cause the base station to: transmit a set of reference signals having different levels of power amplifier compression; and receive a measurement report based at least in part on measurements of the set of reference signals.

In some aspects, an apparatus for wireless communication includes means for receiving a set of reference signals having different levels of power amplifier compression; and means for transmitting a measurement report based at least in part on measurements of the set of reference signals.

In some aspects, an apparatus for wireless communication includes means for transmitting a set of reference signals having different levels of power amplifier compression; and means for receiving a measurement report based at least in part on measurements of the set of reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
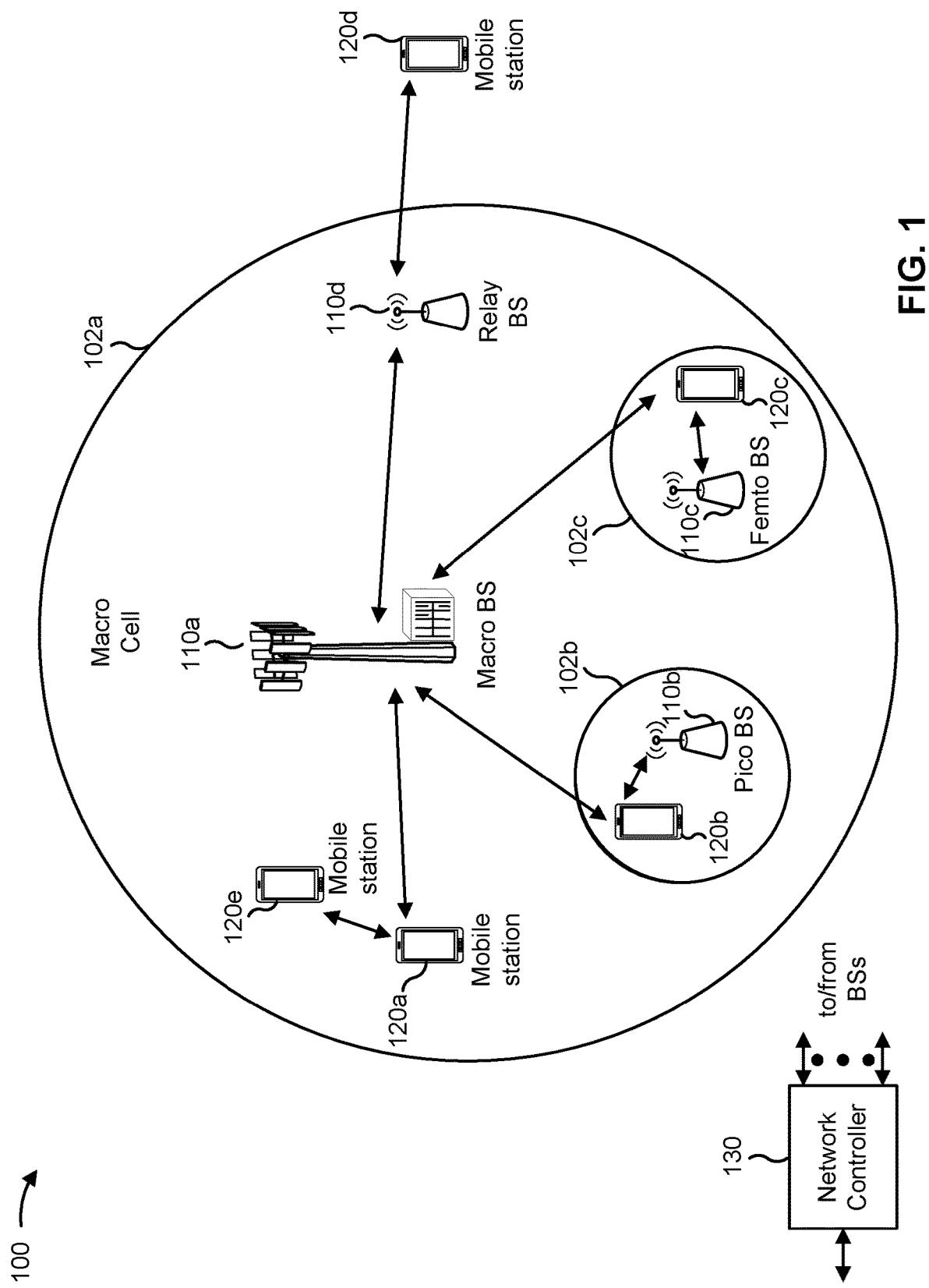
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by mobile stations with service subscription. A pico cell may cover a relatively small geographic area and may allow unrestricted access by mobile stations with service subscription. A femto cell may cover a relatively small geographic area (e.g., a home) and may allow restricted access by mobile stations having association with the femto cell (e.g., mobile stations in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a mobile station) and send a transmission of the data to a downstream station (e.g., a mobile station or a BS). A relay station may also be a mobile station that can relay transmissions for other mobile stations. In the example shown in FIG. 1, a relay BS 110*d* may communicate with macro BS 110*a* and a mobile station 120*d* in order to facilitate communication between BS 110*a* and mobile station 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

Mobile stations 120 (e.g., 120*a*, 120*b*, 120*c*) may be dispersed throughout wireless network 100, and each mobile station may be stationary or mobile. A mobile station may also be referred to as an access terminal, a terminal, a mobile station, a subscriber unit, a station, or the like. A mobile station may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some mobile stations may be considered machine-type communication (MTC) or evolved or enhanced machine-type communication (eMTC) mobile stations. MTC and eMTC mobile stations include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some mobile stations may be considered Internet-of-Things (IoT) devices, and/or may be implemented as NB-IoT (narrowband internet of things) devices. Some mobile stations may be considered a Customer Premises Equipment (CPE). mobile station 120 may be included inside a housing that houses components of mobile station 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more mobile stations 120 (e.g., shown as mobile station 120*a* and mobile station 120*e*) may communicate directly using one or more sidelink channels (e.g., without using a base station 110 as an intermediary to communicate with one another). For example, the mobile stations 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the mobile station 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
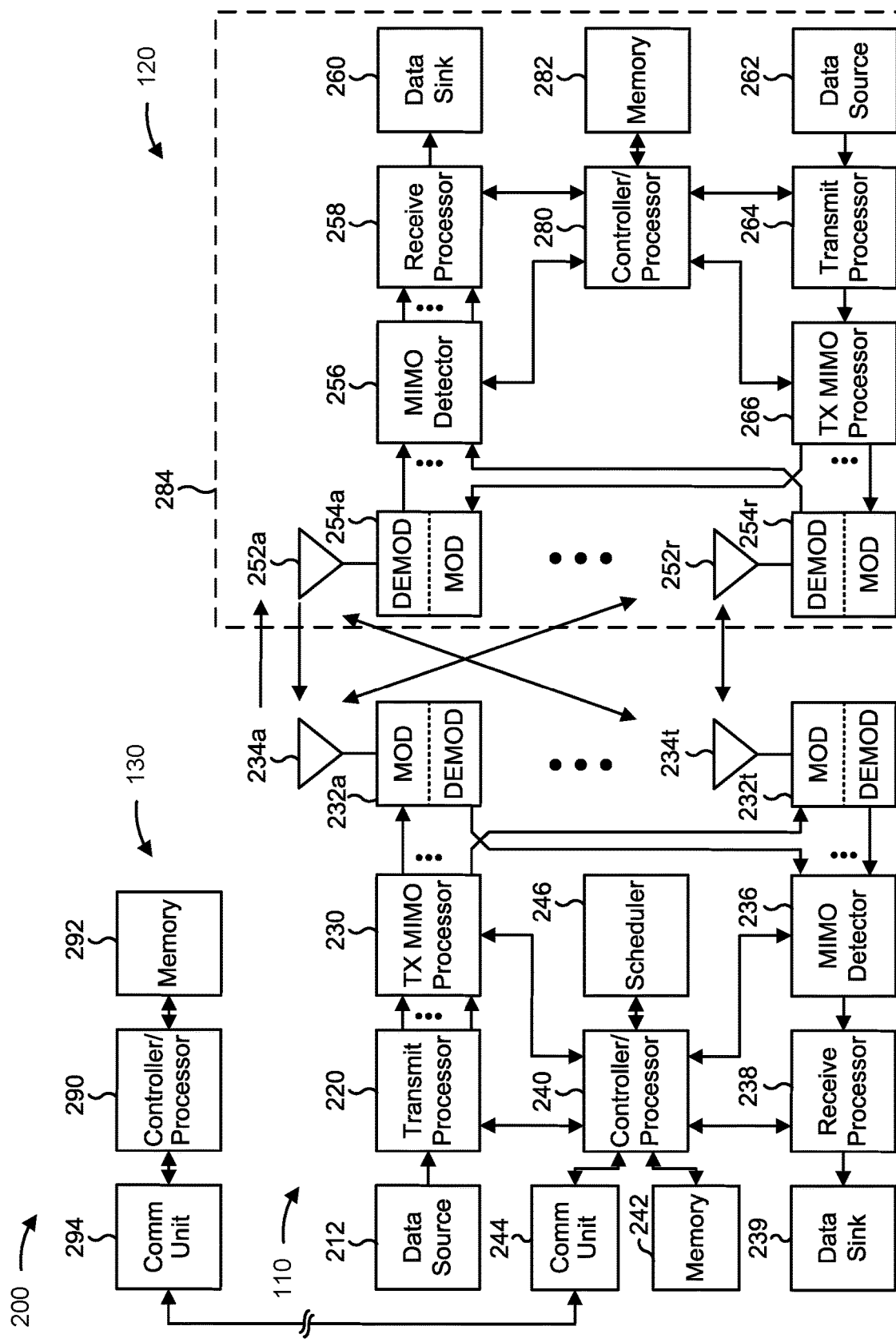
FIG. 2 is a diagram illustrating an example of a base station in communication with a mobile station in a wireless network, in accordance with the present disclosure.

FIG. 2 is a diagram illustrating an example 200 of a base station 110 in communication with a mobile station 120 in a wireless network 100, in accordance with the present disclosure. Base station 110 may be equipped with T antennas 234a through 234t, and mobile station 120 may be equipped with R antennas 252a through 252r, where in general T≥1 and R≥1.

At base station 110, a transmit processor 220 may receive data from a data source 212 for one or more mobile stations, select one or more modulation and coding schemes (MCS) for each mobile station based at least in part on channel quality indicators (CQIs) received from the mobile station, process (e.g., encode and modulate) the data for each mobile station based at least in part on the MCS(s) selected for the mobile station, and provide data symbols for all mobile stations. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At mobile station 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for mobile station 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of mobile station 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at mobile station 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the mobile station 120 may be included in a modem of the mobile station 120. In some aspects, the mobile station 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from mobile station 120 and other mobile stations may be received by antennas 234, processed by demodulators 232, detected by a MIMO detector 236 if applicable, and further processed by a receive processor 238 to obtain decoded data and control information sent by mobile station 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule mobile stations 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of mobile station 120, and/or any other component(s) of FIG. 2 may perform one or more techniques associated with reference signals for power amplifier compression measurements, as described in more detail elsewhere herein. For example, controller/processor 240 of base station 110, controller/processor 280 of mobile station 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and mobile station 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the mobile station 120, may cause the one or more processors, the mobile station 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the mobile station includes means for receiving, by the mobile station, a set of reference signals having different levels of power amplifier compression; and/or means for transmitting, by the mobile station, a measurement report based at least in part on measurements of the set of reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for estimating kernels associated with determining power amplifier non-linearity for the different levels of power amplifier compression, and/or means for estimating coefficients of kernels associated with determining power amplifier non-linearity for the different levels of power amplifier compression.

In some aspects, the mobile station includes means for determining one or more of a precoding matrix indicator (PMI), a rank indicator (RI), or channel quality information (CQI) for reference signals of the set of reference signals, wherein the measurement report indicates one or more of the PMI, the RI, or the CQI for the reference signals of the set of reference signals.

In some aspects, the mobile station includes means for receiving an indication of a power amplifier compression to be used for one or more downlink communications, wherein the power amplifier compression is based at least in part on the measurement report.

In some aspects, the mobile station includes means for receiving the indication of the power amplifier compression to be used for the one or more downlink communications via one or more of downlink control information or a medium access control element.

In some aspects, the mobile station includes means for transmitting an indication of one or more candidate levels of amplifier compression for selection by a base station.

In some aspects, the mobile station includes means for transmitting an indication of a capability to receive the set of reference signals having different levels of power amplifier compression.

In some aspects, the mobile station includes means for receiving the set of reference signals having different levels of power amplifier compression periodically or aperiodically.

In some aspects, the mobile station includes means for receiving an additional set of reference signals having different levels of power amplifier compression based at least in part on one or more of: a change of channel conditions that satisfies a threshold amount of change, a mobility of the mobile station that satisfies a threshold amount of mobility, or a temperature change of the mobile station that satisfies a threshold amount of temperature change.

In some aspects, the mobile station includes means for transmitting a request to change a level of power amplifier compression used for one or more downlink communications.

In some aspects, the base station includes means for transmitting, by the base station, a set of reference signals having different levels of power amplifier compression; and/or means for receiving, by the base station, a measurement report based at least in part on measurements of the set of reference signals. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an indication of a power amplifier compression to be used for one or more downlink communications, wherein the power amplifier compression is based at least in part on the measurement report.

In some aspects, the base station includes means for transmitting the indication of the power amplifier compression to be used for the one or more downlink communications via one or more of downlink control information or a medium access control element.

In some aspects, the base station includes means for receiving an indication of one or more candidate levels of amplifier compression for selection by the base station.

In some aspects, the base station includes means for receiving an indication of a capability of a mobile station to receive the set of reference signals having different levels of power amplifier compression.

In some aspects, the base station includes means for transmitting the set of reference signals having different levels of power amplifier compression periodically or aperiodically.

In some aspects, the base station includes means for transmitting an additional set of reference signals having different levels of power amplifier compression based at least in part on one or more of: a change of channel conditions that satisfies a threshold amount of change, a mobility of a mobile station that satisfies a threshold amount of mobility of a mobile station, or a temperature change of the mobile station that satisfies a threshold amount of temperature change.

In some aspects, the base station includes means for receiving a request to change a level of power amplifier compression used for one or more downlink communications.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
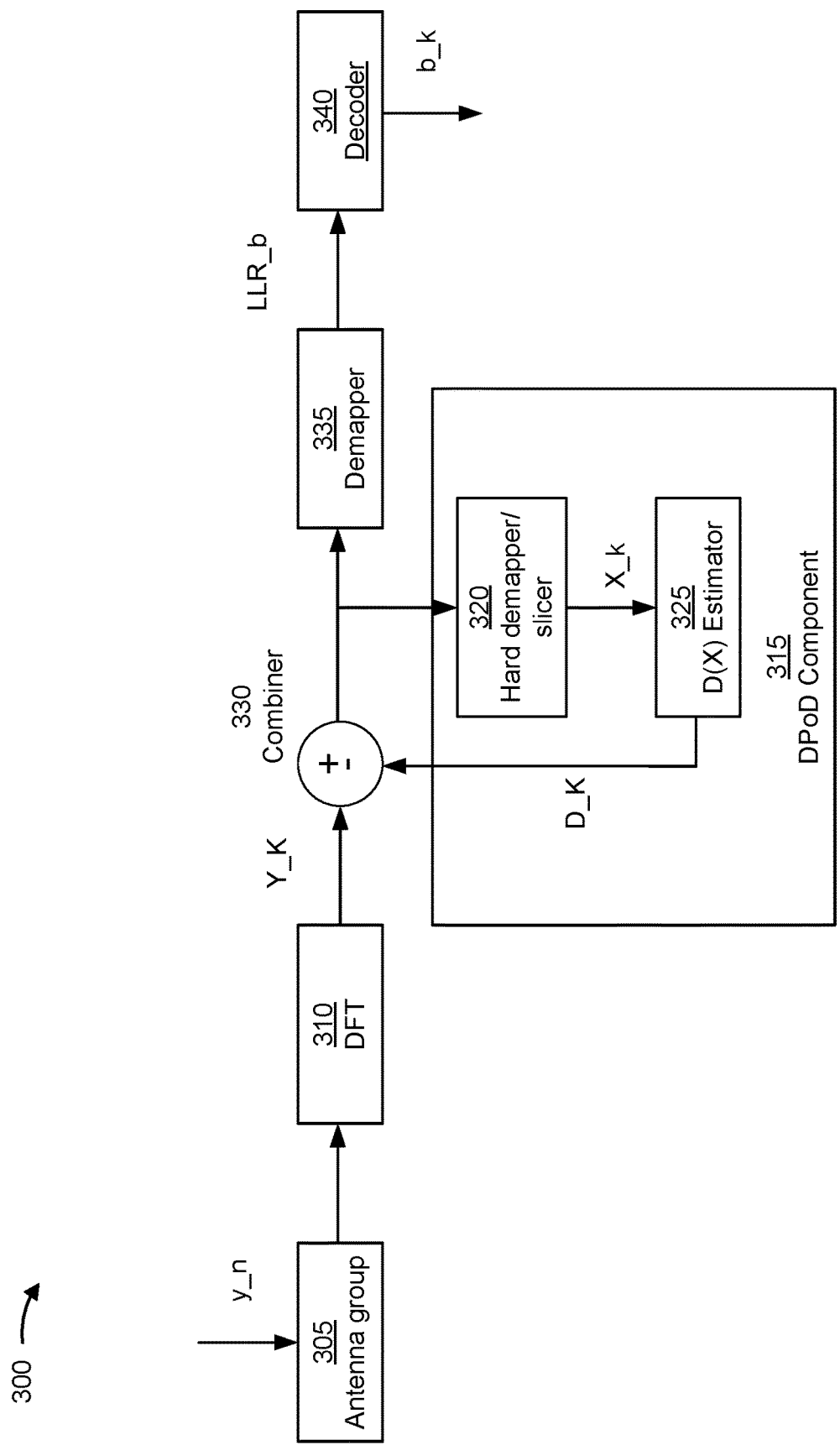
FIG. 3 is a diagram illustrating an example of a digital post distortion process performed by a receiver device, in accordance with the present disclosure.

FIG. 3 is a diagram illustrating an example 300 of a digital post distortion process performed by a receiver device, in accordance with the present disclosure. For example, a receiver device (e.g., a mobile station) may receive a downlink communication, carried on signals, from a transmitter device (e.g., a base station). In some networks, the transmitter device may transmit signals with increasing non-linearity as power amplification increases. For example, a power amplifier (PA) of the transmitter device may distort a signal as a result of a relatively high peak to average power ratio (PAPR). The receiver may perform a digital post distortion (DPoD) process to correct for (e.g., estimate and/or remove) non-linear noise and address clipping issues that may arise as a result of the increased non-linearity introduced by power amplification.

As shown in example 300, an antenna group component 305 may receive one or more signals (e.g., y_n) that are mapped to resources in a time domain and a frequency domain. Discrete Fourier transform (DFT) component 310 may be used to transform the signals into frequency domain signals (e.g., Y_K). After DFT, the receiver device may perform the DPoD process to remove non-linear noise from the signals.

The receiver device may perform the DPoD process iteratively, where in each iteration, a DPoD component 15 may perform hard decision slicing (e.g., using hard demapper/slicer component 320). Hard decision slicing uses sliced symbols in the frequency domain (e.g., Y_K) to reconstruct the time domain signal (e.g., an estimation of the time domain signal) as generated by the transmitter device before power amplification. The reconstructed time domain signal (e.g., X_k) is then passed through a non-linear model (e.g., D(X) estimator component 325) to estimate and/or correct for non-linearity of the time domain signal and produce an estimated non-linearity of the time domain signal (e.g., D_K).

The non-linear model may use a variety of kernels to estimate the non-linearity of the reconstructed time domain signal. In each iteration of the DPoD process, a kernel or set of kernels may be used to estimate the non-linearity of the reconstructed time domain signal. For example, memory-less kernels (e.g., kernels that act on samples without using prior iteration/timing data), such as $x^*|x|^2$ and/or $x^*|x|^4$, among other examples, may be used to estimate non-linearity. In some situations, (e.g., large bandwidth, high signal-to-noise ratio (SNR)), the non-linear model may use memory kernels (e.g., kernels that use a mixture of different time samples), such as $x[n]^*|x[n-k]|^M$, where x is a sample of the signal, n is a timestamp, k is a delay value, and M is an integer. Other kernels may also be used, such as $x_n^2 \cdot x_{n-1}^*$, and/or $|x_n| \cdot x_{n+1}$, among other examples.

The estimated non-linearity (e.g., D_K) may then be removed (e.g., subtracted) from the time domain signal (e.g., Y_K) by combiner component 330. After estimating and removing non-linearity (e.g., non-linear noise, or error), the DPoD process may proceed with further iterations or continue with signal demapping and decoding. For example, the receiver device may demap output from the combiner 330 (e.g., using demapper component 335) to generate a log-likelihood ratio (LLR) demapped signal (e.g., LLR_b) for which power amplification (PA) non-linearity has been corrected. The receiver may decode the demapped signal to generate a payload of the signal (b_k).

However, the estimation process (e.g., applying the non-linear model using a kernel on the pre-power amplified time domain reconstructed signal) may be computationally expensive. In addition, application of a kernel may be performed on oversampled signals to avoid aliasing associated with high order power. While multiple kernel options may be available for use in the DPoD process, the performance of the kernels depends on PA compression level. Estimating the kernels and their coefficients (e.g., the non-linear model) is a complex task that the receiver device may fail to perform in real time concurrently with data processing (e.g., physical downlink control channel (PDCCH)/physical downlink shared channel (PDSCH) decoding). For at least these reasons, iteratively performing the DPoD process uses significant computational and power resources of the receiver (e.g., the mobile station 120), which may result in an inefficient use of resources (e.g., computing resources, power resources, and/or time, among other examples).

As indicated above, FIG. 3 is provided as an example. Other examples may differ from what is described with respect to FIG. 3.

In some aspects described herein, a base station may transmit a set of resource signals (RSs), with different levels of PA compression. The mobile station may estimate kernels and/or coefficients of the kernels for determining PA non-linearity for each of the RSs (e.g., at different levels of PA compression). The mobile station may transmit, to the base station, a measurement report or other indication regarding candidate levels of PA compression for selection by the base station. For example, the measurement report may include, for each level of PA compression, a precoding matrix indicator (PMI), a channel quality indicator (CQI), and/or a rank indication (RI), among other examples. The base station may use the report to determine which PA compression should be used for downlink communications with the mobile station.

In some aspects, the base station may use the report to transmit, to the mobile station, an indication of a PA compression to be used for downlink communications, which may enable the mobile station to use the indicated PA compression in a DPoD process. The indication of the PA compression may include an indication of a reference signal (e.g., previously sent to the mobile station) that has a same level of PA compression and/or an explicit indication of the PA compression. In some aspects, the mobile station may request that the base station change a level of PA compression (e.g., based at least in part on mobile station capabilities and/or efficiency considerations, among other examples), and the base station may transmit, to the mobile station, a set of additional RSs having different levels of PA compression, which may enable the mobile station to provide an updated report and cause the base station to change/update the level of PA compression to be used for subsequent downlink communications.

In this way, the base station and mobile station may communicate using signals having PA compression levels that the mobile station is capable of processing (e.g., using DPoD processing) to remove non-linearity from the signals, without the need for the mobile station to iteratively apply DPoD processing using different kernel and coefficient combinations. This may reduce the time required and computational complexity involved in DPoD processing. In addition, the reduction in DPoD processing may reduce latency and conserve mobile station resources (e.g., computing resources, power resources, and/or time, among other examples) that would otherwise be used to iterate through different kernel and coefficient combinations for DPoD processing.

Figure 4:
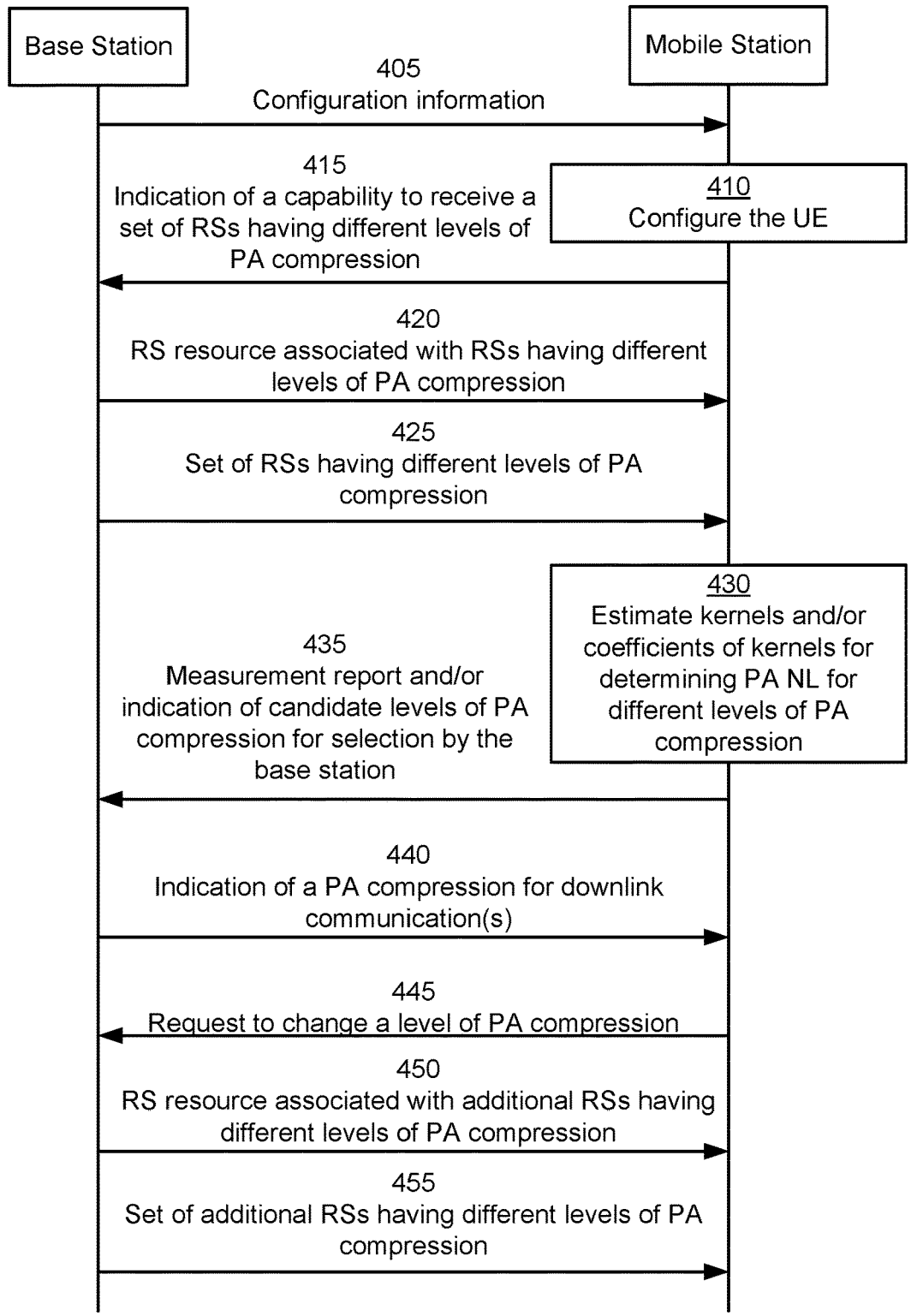
FIG. 4 is a diagram illustrating an example associated with reference signals for power amplifier compression measurements, in accordance with the present disclosure.

FIG. 4 is a diagram illustrating an example 400 associated with reference signals for power amplifier compression measurements, in accordance with the present disclosure. As shown in FIG. 4, a base station (e.g., base station 110) and a mobile station (e.g., mobile station 120) may communicate with one another.

As show by reference number 405, the base station may transmit, and the mobile station may receive, configuration information. In some aspects, the mobile station may receive the configuration information via one or more of radio resource control (RRC) signaling, MAC control elements (MAC-CEs), and/or downlink control information (DCI), among other examples. In some aspects, the configuration information may include an indication of one or more configuration parameters (e.g., already known to the mobile station) for selection by the mobile station, and/or explicit configuration information for the mobile station to use to configure the mobile station, among other examples.

In some aspects, the configuration information may indicate that the mobile station is to transmit (e.g., to a base station) an indication that the mobile station has a capability to receive (e.g., supports reception of) a set of RSs having different levels of PA compression. In some aspects, the configuration information may indicate that the mobile station is to receive a set of RSs (e.g., channel state information RSs (CSI-RSs)) having different levels of PA compression and is to transmit a measurement report based at least in part on measurements of the set of RSs (e.g., PMI, CQI, and/or RI, among other examples). In some aspects, the configuration information may indicate that the mobile station is to estimate kernels, and/or coefficients of kernels, associated with determining PA non-linearity for different levels of PA compression. In some aspects, the configuration information may indicate that the mobile station is to determine a PMI, CQI, and/or RI for the set of RSs, and that the measurement report is to indicate the PMI, CQI, and/or RI for the set of RSs. In some aspects, the configuration information may indicate that the mobile station is to receive an indication of PA compression to be used for one or more downlink communications, where the PA compression is based at least in part on the measurement report. The configuration information may indicate that the mobile station is to receive the indication of the PA compression via DCI and/or a MAC-CE.

In some aspects, the configuration information may indicate that the mobile station is to transmit an indication of one or more candidate levels of PA compression for selection by a base station. For example, in some aspects, the indication may include an indication of a preferred level of PA for downlink communications (e.g., preferred based at least in part on available computing resources of the mobile station, available power resources of the mobile station, and/or channel conditions, among other examples).

In some aspects, the configuration information may indicate that the mobile station is to periodically, or aperiodocially, receive the set of RSs having different levels of PA compression (e.g., for periodic, or aperiodic, measurement and/or reporting). In some aspects, the configuration information may indicate that the mobile station is to receive an additional set of RSs having different levels of PA compression based at least in part on a change of channel conditions that satisfies a threshold amount of change, a mobility of the mobile station that satisfies a threshold amount of mobility, and/or a temperature change of the mobile station that satisfies a threshold amount of temperature change.

As shown by reference number 410, the mobile station may configure itself based at least in part on the configuration information. In some aspects, the mobile station may be configured to perform one or more operations described herein based at least in part on the configuration information.

As shown by reference number 415, the mobile station may transmit, and the base station may receive, an indication of a mobile station capability to receive a set of RSs having different levels of PA compression. In some aspects, the mobile station may transmit the indication as part of an RRC configuration process. For example, the mobile station may transmit the indication in connection with a mobile station capability report during or after an RRC configuration process. In some aspects, the mobile station capability to receive a set of RSs having different levels of PA compression may be based at least in part on a configuration of the mobile station, components of the mobile station, and/or availability of resources of the mobile station.

As shown by reference number 420, the base station may transmit, and the mobile station may receive, an RS resource associated with RSs having different levels of PA compression. In some aspects, the RS resource may include configuration information (e.g., time resources and/or frequency resources, among other examples) to indicate that the mobile station is to receive a set of RSs having different levels of compression, for which the mobile station is to estimate one or more kernels and/or coefficients, as described herein. In some aspects, the RS resource may indicate an RS identification, a compression level, and/or one or more other parameters associated with RSs of the set of RSs.

As shown by reference number 425, the base station may transmit, and the mobile station may receive, the set of RSs having different levels of PA compression (e.g., DPoD-RSs). For example, the base station may transmit, and the mobile station may receive, multiple CSI-RSs with different levels of PA compression (e.g., 1 dB, 2 dB, 5 dB, and/or 10 dB of compression, among other examples) for transmitting signals.

In some aspects, the base station may transmit, and the mobile station may receive, the DPoD-RSs periodically or aperiodically, which may enable periodic, or aperiodic, determinations of which PA compression levels to use, as described elsewhere herein. For example, in some aspects, aperiodic transmission may be scheduled (e.g., triggered) based at least in part on a change in channel conditions (e.g., signal-to-interference-plus-noise ratio (SINR)) satisfying a threshold amount of change, a mobility of the mobile station (e.g., a change in location of and/or beam used by the mobile station) satisfying a threshold amount of mobility, and/or a temperature change of the mobile station satisfying a threshold amount of temperature change, among other examples. This may enable the PA compression level to be updated based at least in part on various events. In some aspects, periodic transmission of sets of RSs may enable regularly scheduled updating of PA compression levels.

In some aspects, the mobile station may (e.g., when receiving the set of RSs) determine a PMI, CQI, and/or RI, among other examples, for the set of RSs (e.g., the DPoD-RSs). This may enable the mobile station to identify channel conditions associated with the set of RSs at different PA compression levels, which may facilitate enabling the mobile station to determine which PA compression level may be preferred for subsequent downlink transmissions and/or enabling the mobile station to provide a report indicating the PMI, CQI, and/or RI, as described elsewhere herein.

As shown by reference number 430, the mobile station may estimate kernels for determining PA non-linearity (NL) for different levels of PA compression (e.g., using the DPoD-RSs). In some aspects, the mobile station may estimate coefficients of kernels associated with determining power amplifier non-linearity for the different levels of power amplifier compression. In some aspects, the mobile station may estimate different combinations of kernels and/or coefficients of the kernels for the different levels of PA compression in the set of RSs. For example, the mobile station may perform an iterative DPoD process, as described herein, using different kernels and/or coefficients for the kernels (e.g., $x^*|x|^2$, $x^*|x|^4$, $x[n]^*|x[n-k]|^M$, $x_n^2 \cdot x_{n-1}^*$, and/or $|x_n| \cdot x_{n+1}$, among other examples) to estimate performance of the kernels and/or coefficients for reducing NL in the DPoD process.

When estimating kernels and/or coefficients, the mobile station may determine, for each DPoD-RS of the set of RSs, a result of the DPoD process (e.g., a reduction in non-linearity produced by the DPoD process) based at least in part on different kernel and/or coefficient combinations. This may enable the mobile station to identify, for each DPoD-RS of the set of RSs, a kernel and/or coefficient combination that results in preferred DPoD results. For example, preferred DPoD results, for a given DPoD-RS of the set of RSs, may include DPoD results having relatively high, or highest, reduction in non-linearity of the DPoD-RS; DPoD results that make relatively efficient use, or most efficient use, of mobile station resources (e.g., computational resources and/or power resources, among other examples) for the set of RSs; and/or DPoD results having a relatively low delay (e.g., latency), or a least delay, in performing the DPoD process; among other examples. Similarly, the mobile station may estimate kernels and/or coefficients of the set of RSs to identify one or more preferred PA compression levels (e.g., preferred based at least in part on reduction in non-linearity, conservation of mobile station resources, and/or reduced latency delay, among other examples).

As shown by reference number 435, the mobile station may transmit, and the base station may receive, a measurement report and/or other indication of candidate levels of PA compression for selection by the base station. In some aspects, as described herein, the measurement report may include PMI, CQI, and/or RI, among other examples, for the set of RSs. This may enable the base station to identify channel conditions associated with the set of RSs at different PA compression levels, which may facilitate a determination of which PA compression level may be preferable for subsequent downlink transmissions.

In some aspects, the other indication may include an indication of one or more candidate levels of PA compression for selection by the base station. For example, in some aspects, the indication may include an indication of one or more DPoD-RSs, of the set of RSs, having levels of PA compression that are preferred for one or more downlink communications, as described herein. For example, preferred levels of PA compression may be preferred based at least in part on available computing resources of the mobile station, available power resources of the mobile station, and/or channel conditions, among other examples.

As shown by reference number 440, the base station may transmit, and the mobile station may receive, an indication of a PA compression for downlink communications. In some aspects, the base station may indicate (e.g., via DCI and/or MAC-CE, among other examples), which PA compression will be used for subsequent downlink transmissions. For example, the base station may indicate a PA compression based at least in part on an indication of an RS that has a same PA compression and/or an explicit indication of the PA compression, among other examples. This may facilitate enabling, for example, the mobile station to apply the correct kernel and/or coefficient combination in performing the DPoD process on the subsequent downlink transmissions.

As shown by reference number 445, the mobile station may transmit, and the base station may receive, a request to change a level of PA compression. For example, in some aspects, the request may be aperiodically triggered based at least in part on a change in channel conditions (e.g., SINR) satisfying a threshold amount of change, a mobility of the mobile station (e.g., a change in location of and/or beam used by the mobile station) satisfying a threshold amount of mobility, and/or a temperature change of the mobile station satisfying a threshold amount of temperature change, among other examples, enabling the PA compression level to be updated based at least in part on various events.

In some aspects, periodic transmission of the request may enable regularly scheduled updating of PA compression levels. In some aspects, the request may include data identifying a preferred PA compression level (e.g., based at least in part on prior kernel and/or coefficient estimates). In some aspects, the request may cause the base station to provide a new set of RSs (e.g., DPoD-RSs) for kernel and/or coefficient re-estimation, which may result in selection of a different PA compression level for subsequent downlink communications.

As shown by reference number 450, the base station may transmit, and the mobile station may receive, an RS resource associated with additional RSs having different levels of PA compression. In some aspects, the RS resource associated with additional RSs may include configuration information (e.g., time resources and/or frequency resources, among other examples) to indicate that the mobile station is to receive an additional set of RSs (e.g., additional DPoD-RSs) having different levels of compression, for which the mobile station is to estimate a kernel and/or one or more coefficients, as described herein.

As shown by reference number 455, the base station may transmit, and the mobile station may receive, a set of additional RSs having different levels of PA. For example, the set of additional RSs may include DPoD-RSs for which the mobile device is to perform kernel and/or coefficient estimation, as described herein. A result of the set of additional RSs may cause a different PA compression level to be used for subsequent downlink communications.

In this way, the base station and mobile station may communicate using signals having PA compression levels that the mobile station is capable of processing (e.g., using DPoD processing) to remove non-linearity from the signals, without the need for the mobile station to iteratively apply DPoD processing using different kernel and coefficient combinations. This may reduce the time required and computational complexity involved in DPoD processing of downlink communications. In addition, the reduction in DPoD processing may reduce latency and conserve mobile station resources (e.g., computing resources, power resources, and/or time, among other examples) that would otherwise be used to iterate through different kernel and coefficient combinations for DPoD processing.

As indicated above, FIG. 4 is provided as an example. Other examples may differ from what is described with respect to FIG. 4.

Figure 5:
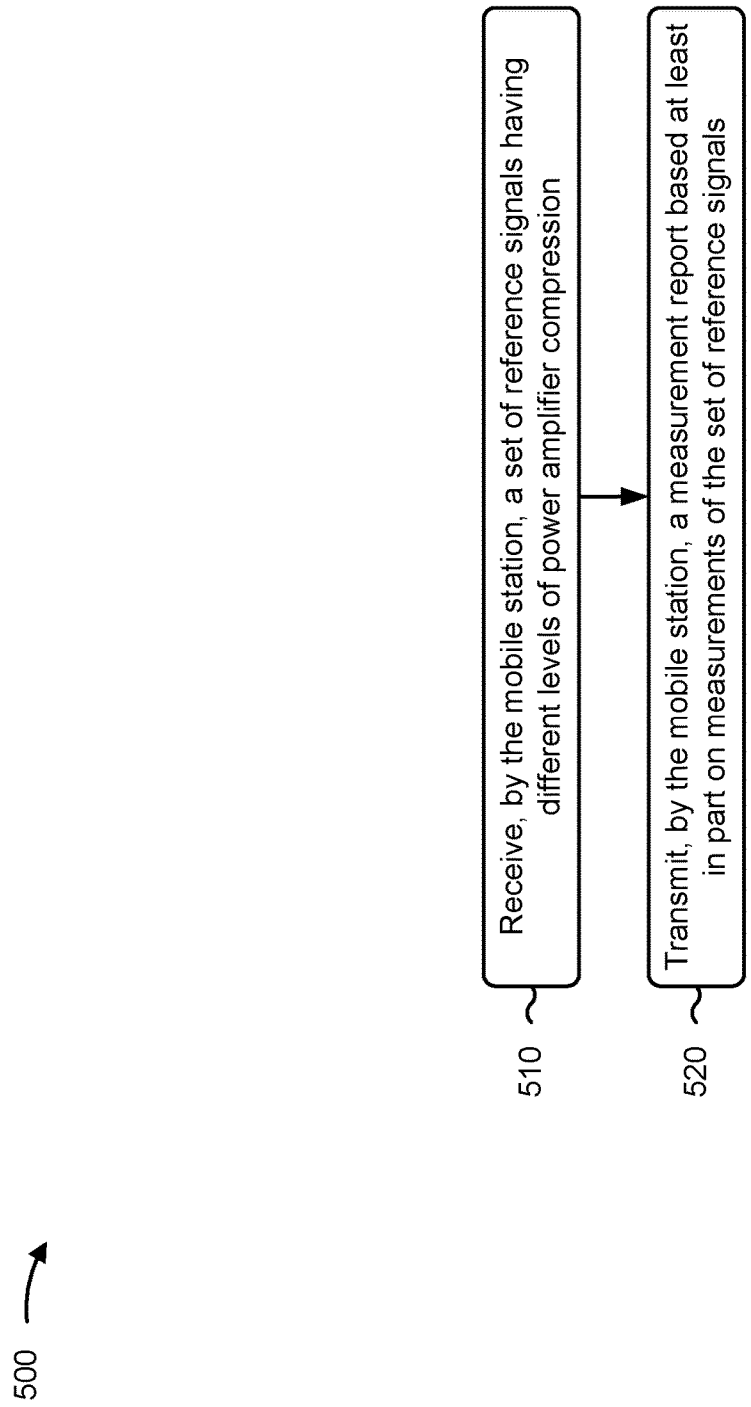
FIGS. 5 and 6 are diagrams illustrating example processes associated with reference signals for power amplifier compression measurements, in accordance with the present disclosure.

FIG. 5 is a diagram illustrating an example process 500 performed, for example, by a mobile station, in accordance with the present disclosure. Example process 500 is an example where the mobile station (e.g., mobile station 120) performs operations associated with reference signals for power amplifier compression measurements.

As shown in FIG. 5, in some aspects, process 500 may include receiving a set of reference signals having different levels of power amplifier compression (block 510). For example, the mobile station (e.g., using reception component 702, depicted in FIG. 7) may receive a set of reference signals having different levels of power amplifier compression, as described above.

As further shown in FIG. 5, in some aspects, process 500 may include transmitting a measurement report based at least in part on measurements of the set of reference signals (block 520). For example, the mobile station (e.g., using transmission component 704, depicted in FIG. 7) may transmit a measurement report based at least in part on measurements of the set of reference signals, as described above.

Process 500 may include additional aspects, such as any single aspect or any combination of aspects described below and/or in connection with one or more other processes described elsewhere herein.

In a first aspect, receiving the set of reference signals having different levels of power amplifier compression comprises one or more of: estimating kernels associated with determining power amplifier non-linearity for the different levels of power amplifier compression, or estimating coefficients of kernels associated with determining power amplifier non-linearity for the different levels of power amplifier compression.

In a second aspect, alone or in combination with the first aspect, receiving the set of reference signals having different levels of power amplifier compression comprises determining one or more of: a precoding matrix indicator (PMI), a rank indicator (RI), or channel quality information (CQI) for reference signals of the set of reference signals, wherein the measurement report indicates one or more of the PMI, the RI, or the CQI for the reference signals of the set of reference signals.

In a third aspect, alone or in combination with one or more of the first and second aspects, process 500 includes receiving an indication of a power amplifier compression to be used for one or more downlink communications, wherein the power amplifier compression is based at least in part on the measurement report.

In a fourth aspect, alone or in combination with one or more of the first through third aspects, receiving the indication of the power amplifier compression to be used for the one or more downlink communications comprises receiving the indication of the power amplifier compression to be used for the one or more downlink communications via one or more downlink control information or a medium access control element.

In a fifth aspect, alone or in combination with one or more of the first through fourth aspects, process 500 includes transmitting an indication of one or more candidate levels of amplifier compression for selection by a base station.

In a sixth aspect, alone or in combination with one or more of the first through fifth aspects, the indication of the one or more candidate levels of amplifier compression includes an indication of one or more reference signals of the set of reference signals having levels of power amplifier compression that are preferred for one or more downlink communications.

In a seventh aspect, alone or in combination with one or more of the first through sixth aspects, the levels of power amplifier compression that are preferred are preferred based at least in part on one or more of: available computing resources of the mobile station, available power resources of the mobile station, or channeling conditions.

In an eighth aspect, alone or in combination with one or more of the first through seventh aspects, process 500 includes transmitting an indication of a capability to receive the set of reference signals having different levels of power amplifier compression.

In a ninth aspect, alone or in combination with one or more of the first through eighth aspects, receiving the set of reference signals having different levels of power amplifier compression comprises receiving the set of reference signals having different levels of power amplifier compression periodically or aperiodically.

In a tenth aspect, alone or in combination with one or more of the first through ninth aspects, process 500 includes receiving an additional set of reference signals having different levels of power amplifier compression based at least in part on one or more of: a change of channel conditions that satisfies a threshold amount of change, a mobility of the mobile station that satisfies a threshold amount of mobility, or a temperature change of the mobile station that satisfies a threshold amount of temperature change.

In an eleventh aspect, alone or in combination with one or more of the first through tenth aspects, process 500 includes transmitting a request to change a level of power amplifier compression used for one or more downlink communications.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
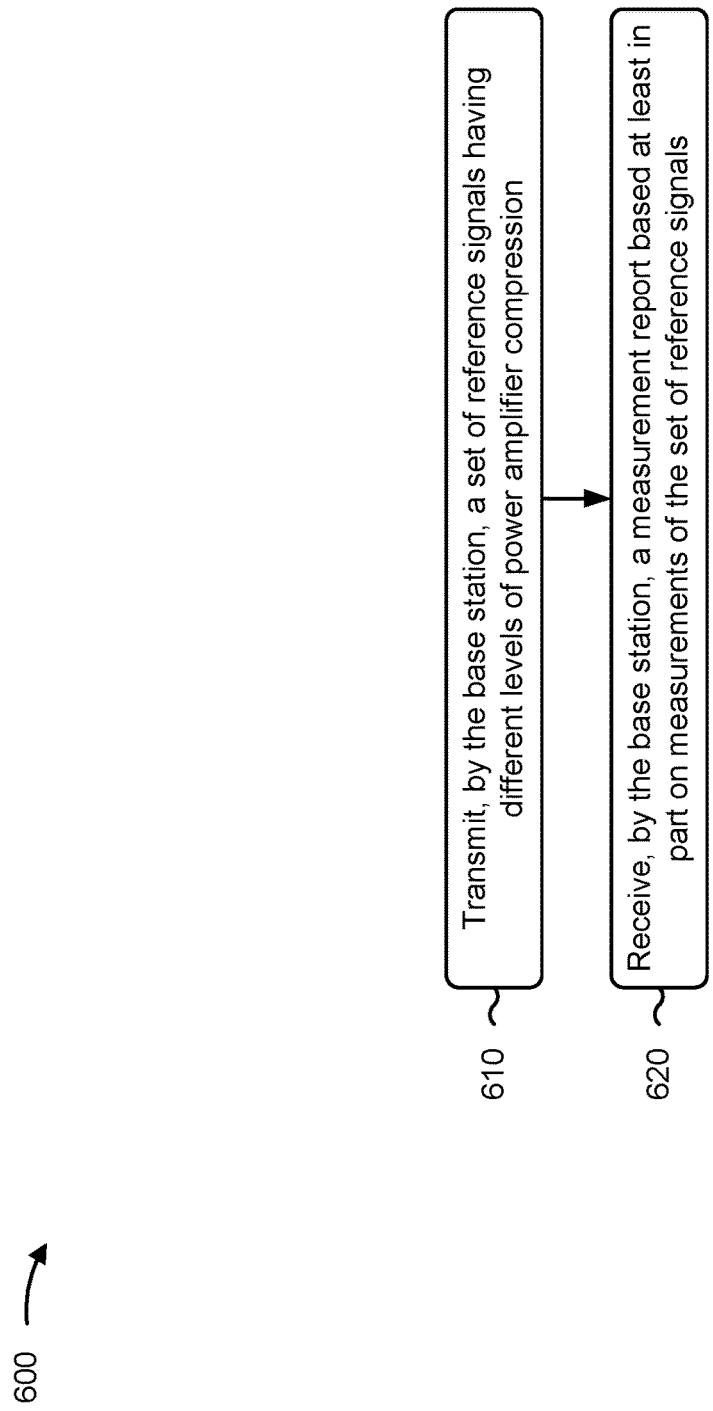

FIG. 6 is a diagram illustrating an example process 600 performed, for example, by a base station, in accordance with the present disclosure. Example process 600 is an example where the base station (e.g., base station 110) performs operations associated with reference signals for power amplifier compression measurements.

As shown in FIG. 6, in some aspects, process 600 may include transmitting a set of reference signals having different levels of power amplifier compression (block 610). For example, the base station (e.g., using transmission component 804, depicted in FIG. 8) may transmit a set of reference signals having different levels of power amplifier compression, as described above.

As further shown in FIG. 6, in some aspects, process 600 may include receiving a measurement report based at least in part on measurements of the set of reference signals (block 620). For example, the base station (e.g., using reception component 802, depicted in FIG. 8) may receive a measurement report based at least in part on measurements of the set of reference signals, as described above.

Process 600 may include additional aspects, such as any single aspect or any combination of aspects described below and/or in connection with one or more other processes described elsewhere herein.

In a first aspect, the measurement report indicates one or more of: a PMI, an RI, or CQI for reference signals of the set of reference signals.

In a second aspect, alone or in combination with the first aspect, process 600 includes transmitting an indication of a power amplifier compression to be used for one or more downlink communications, wherein the power amplifier compression is based at least in part on the measurement report.

In a third aspect, alone or in combination with one or more of the first and second aspects, transmitting the indication of the power amplifier compression to be used for the one or more downlink communications comprises transmitting the indication of the power amplifier compression to be used for the one or more downlink communications via one or more of downlink control information or a medium access control element.

In a fourth aspect, alone or in combination with one or more of the first through third aspects, process 600 includes receiving an indication of one or more candidate levels of amplifier compression for selection by the base station.

In a fifth aspect, alone or in combination with one or more of the first through fourth aspects, the indication of the one or more candidate levels of amplifier compression includes an indication of one or more reference signals of the set of reference signals having levels of power amplifier compression that are preferred for one or more downlink communications.

In a sixth aspect, alone or in combination with one or more of the first through fifth aspects, the levels of power amplifier compression that are preferred are preferred based at least in part on one or more of: available computing resources of a mobile station, available power resources of the mobile station, or channeling conditions.

In a seventh aspect, alone or in combination with one or more of the first through sixth aspects, process 600 includes receiving an indication of a capability of a mobile station to receive the set of reference signals having different levels of power amplifier compression.

In an eighth aspect, alone or in combination with one or more of the first through seventh aspects, transmitting the set of reference signals having different levels of power amplifier compression comprises transmitting the set of reference signals having different levels of power amplifier compression periodically or aperiodically.

In a ninth aspect, alone or in combination with one or more of the first through eighth aspects, process 600 includes transmitting an additional set of reference signals having different levels of power amplifier compression based at least in part on one or more of: a change of channel conditions that satisfies a threshold amount of change, a mobility of a mobile station that satisfies a threshold amount of mobility of a mobile station, or a temperature change of the mobile station that satisfies a threshold amount of temperature change.

In a tenth aspect, alone or in combination with one or more of the first through ninth aspects, process 600 includes receiving a request to change a level of power amplifier compression used for one or more downlink communications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
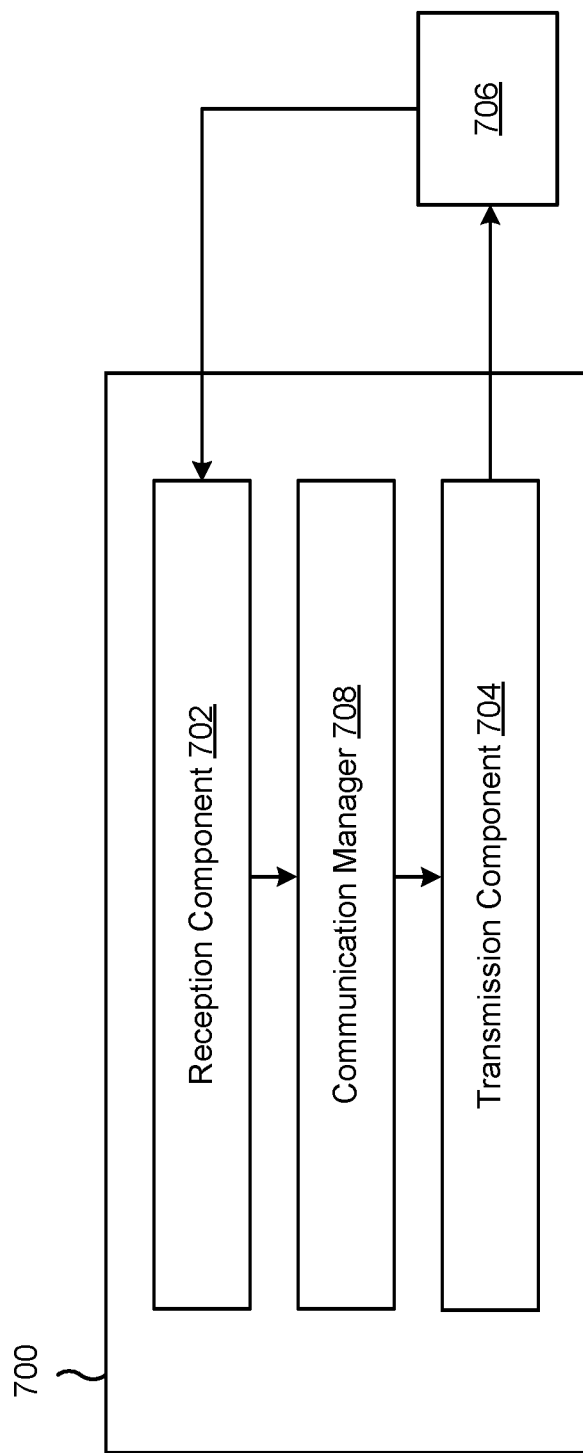
FIGS. 7 and 8 are block diagrams of example apparatuses for wireless communication, in accordance with the present disclosure.

FIG. 7 is a block diagram of an example apparatus 700 for wireless communication. The apparatus 700 may be a mobile station, or a mobile station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a mobile station, a base station, or another wireless communication device) using the reception component 702 and the transmission component 704. As further shown, the apparatus 700 may include a communication manager 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the mobile station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the mobile station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the mobile station described above in connection with FIG. 2. In some aspects, the transmission component 704 may be co-located with the reception component 702 in a transceiver.

The reception component 702 may receive a set of reference signals having different levels of power amplifier compression. The transmission component 704 may transmit a measurement report based at least in part on measurements of the set of reference signals.

The reception component 702 may receive an indication of a power amplifier compression to be used for one or more downlink communications, wherein the power amplifier compression is based at least in part on the measurement report.

The transmission component 704 may transmit an indication of one or more candidate levels of amplifier compression for selection by a base station.

The transmission component 704 may transmit an indication of a capability to receive the set of reference signals having different levels of power amplifier compression.

The reception component 702 may receive an additional set of reference signals having different levels of power amplifier compression based at least in part on one or more of: a change of channel conditions that satisfies a threshold amount of change, a mobility of the mobile station that satisfies a threshold amount of mobility, or a temperature change of the mobile station that satisfies a threshold amount of temperature change.

The transmission component 704 may transmit a request to change a level of power amplifier compression used for one or more downlink communications.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
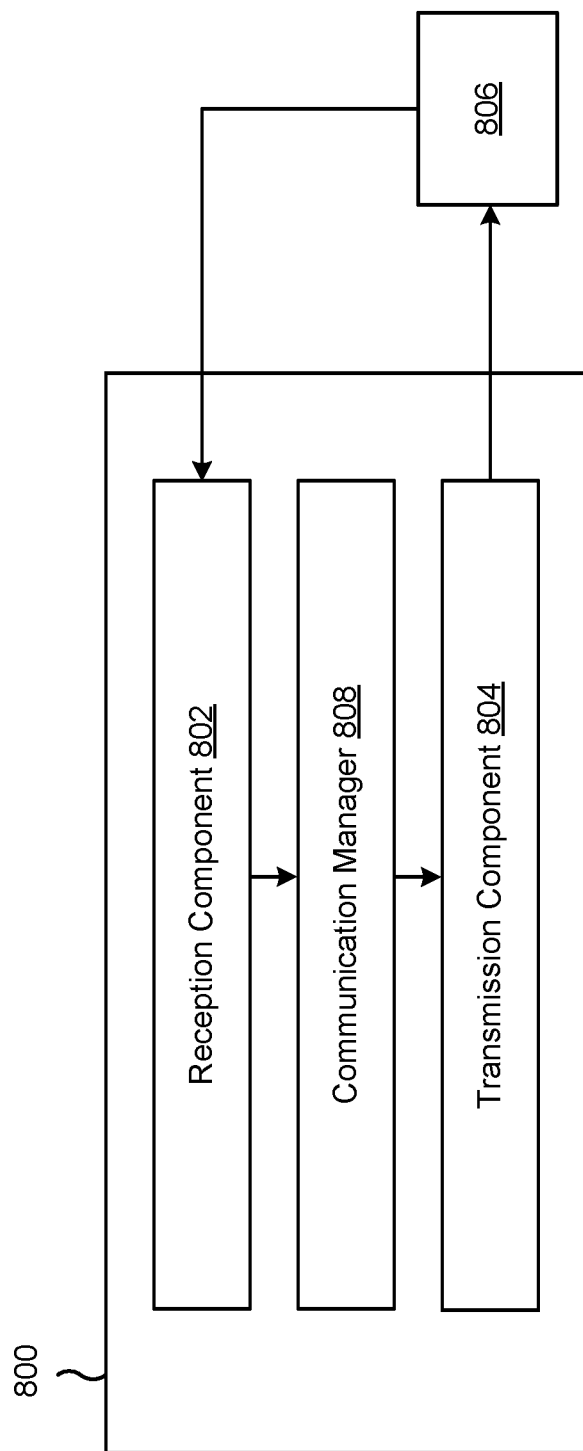

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a mobile station, a base station, or another wireless communication device) using the reception component 802 and the transmission component 804. As further shown, the apparatus 800 may include a communication manager 808, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit a set of reference signals having different levels of power amplifier compression. The reception component 802 may receive a measurement report based at least in part on measurements of the set of reference signals.

The transmission component 804 may transmit an indication of a power amplifier compression to be used for one or more downlink communications, wherein the power amplifier compression is based at least in part on the measurement report.

The reception component 802 may receive an indication of one or more candidate levels of amplifier compression for selection by the base station.

The reception component 802 may receive an indication of a capability of a mobile station to receive the set of reference signals having different levels of power amplifier compression.

The transmission component 804 may transmit an additional set of reference signals having different levels of power amplifier compression based at least in part on one or more of: a change of channel conditions that satisfies a threshold amount of change, a mobility of a mobile station that satisfies a threshold amount of mobility of a mobile station, or a temperature change of the mobile station that satisfies a threshold amount of temperature change.

The reception component 802 may receive a request to change a level of power amplifier compression used for one or more downlink communications.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a mobile station, comprising: receiving, by the mobile station, a set of reference signals having different levels of power amplifier compression; and transmitting, by the mobile station, a measurement report based at least in part on measurements of the set of reference signals.

Aspect 2: The method of Aspect 1, wherein receiving the set of reference signals having different levels of power amplifier compression comprises one or more of: estimating kernels associated with determining power amplifier non-linearity for the different levels of power amplifier compression, or estimating coefficients of kernels associated with determining power amplifier non-linearity for the different levels of power amplifier compression.

Aspect 3: The method of any of Aspects 1-2, wherein receiving the set of reference signals having different levels of power amplifier compression comprises: determining one or more of a precoding matrix indicator (PMI), a rank indicator (RI), or channel quality information (CQI) for reference signals of the set of reference signals, wherein the measurement report indicates one or more of the PMI, the RI, or the CQI for the reference signals of the set of reference signals.

Aspect 4: The method of any of Aspects 1-3, further comprising: receiving an indication of a power amplifier compression to be used for one or more downlink communications, wherein the power amplifier compression is based at least in part on the measurement report.

Aspect 5: The method of Aspect 4, wherein receiving the indication of the power amplifier compression to be used for the one or more downlink communications comprises: receiving the indication of the power amplifier compression to be used for the one or more downlink communications via one or more of downlink control information or a medium access control element.

Aspect 6: The method of any of Aspects 1-5, further comprising: transmitting an indication of one or more candidate levels of amplifier compression for selection by a base station.

Aspect 7: The method of Aspect 6, wherein the indication of the one or more candidate levels of amplifier compression includes: an indication of one or more reference signals of the set of reference signals having levels of power amplifier compression that are preferred for one or more downlink communications.

Aspect 8: The method of Aspect 7, wherein the levels of power amplifier compression that are preferred are preferred based at least in part on one or more of: available computing resources of the mobile station, available power resources of the mobile station, or channel conditions.

Aspect 9: The method of any of Aspects 1-8, further comprising: transmitting an indication of a capability to receive the set of reference signals having different levels of power amplifier compression.

Aspect 10: The method of any of Aspects 1-9, wherein receiving the set of reference signals having different levels of power amplifier compression comprises: receiving the set of reference signals having different levels of power amplifier compression periodically or aperiodically.

Aspect 11: The method of any of Aspects 1-10, further comprising: receiving an additional set of reference signals having different levels of power amplifier compression based at least in part on one or more of: a change of channel conditions that satisfies a threshold amount of change, a mobility of the mobile station that satisfies a threshold amount of mobility, or a temperature change of the mobile station that satisfies a threshold amount of temperature change.

Aspect 12: The method of any of Aspects 1-11, further comprising: transmitting a request to change a level of power amplifier compression used for one or more downlink communications.

Aspect 13: A method of wireless communication performed by a base station, comprising: transmitting, by the base station, a set of reference signals having different levels of power amplifier compression; and receiving, by the base station, a measurement report based at least in part on measurements of the set of reference signals.

Aspect 14: The method of Aspect 13, wherein the measurement report indicates one or more of a precoding matrix indicator (PMI), a rank indicator (RI), or channel quality information (CQI) for reference signals of the set of reference signals.

Aspect 15: The method of any of Aspects 13-14, further comprising: transmitting an indication of a power amplifier compression to be used for one or more downlink communications, wherein the power amplifier compression is based at least in part on the measurement report.

Aspect 16: The method of Aspect 15, wherein transmitting the indication of the power amplifier compression to be used for the one or more downlink communications comprises: transmitting the indication of the power amplifier compression to be used for the one or more downlink communications via one or more of downlink control information or a medium access control element.

Aspect 17: The method of any of Aspects 13-16, further comprising: receiving an indication of one or more candidate levels of amplifier compression for selection by the base station.

Aspect 18: The method of Aspect 17, wherein the indication of the one or more candidate levels of amplifier compression includes: an indication of one or more reference signals of the set of reference signals having levels of power amplifier compression that are preferred for one or more downlink communications.

Aspect 19: The method of Aspect 18, wherein the levels of power amplifier compression that are preferred are preferred based at least in part on one or more of: available computing resources of a mobile station, available power resources of the mobile station, or channel conditions.

Aspect 20: The method of any of Aspects 13-19, further comprising: receiving an indication of a capability of a mobile station to receive the set of reference signals having different levels of power amplifier compression.

Aspect 21: The method of any of Aspects 13-20, wherein transmitting the set of reference signals having different levels of power amplifier compression comprises: transmitting the set of reference signals having different levels of power amplifier compression periodically or aperiodically.

Aspect 22: The method of any of Aspects 13-21, further comprising: transmitting an additional set of reference signals having different levels of power amplifier compression based at least in part on one or more of: a change of channel conditions that satisfies a threshold amount of change, a mobility of a mobile station that satisfies a threshold amount of mobility of a mobile station, or a temperature change of the mobile station that satisfies a threshold amount of temperature change.

Aspect 23: The method of any of Aspects 13-22, further comprising: receiving a request to change a level of power amplifier compression used for one or more downlink communications.

Aspect 24: An apparatus for wireless communication at a device, comprising a processor; memory coupled with the processor; and instructions stored in the memory and executable by the processor to cause the apparatus to perform the method of one or more Aspects of Aspects 1-12.

Aspect 25: An apparatus for wireless communication at a device, comprising a processor; memory coupled with the processor; and instructions stored in the memory and executable by the processor to cause the apparatus to perform the method of one or more Aspects of Aspects 12-23.

Aspect 26: A device for wireless communication, comprising a memory and one or more processors coupled to the memory, the memory and the one or more processors configured to perform the method of one or more Aspects of Aspects 1-12.

Aspect 27: A device for wireless communication, comprising a memory and one or more processors coupled to the memory, the memory and the one or more processors configured to perform the method of one or more Aspects of Aspects 13-23.

Aspect 28: An apparatus for wireless communication, comprising at least one means for performing the method of one or more Aspects of Aspects 1-12.

Aspect 29: An apparatus for wireless communication, comprising at least one means for performing the method of one or more Aspects of Aspects 13-23.

Aspect 30: A non-transitory computer-readable medium storing code for wireless communication, the code comprising instructions executable by a processor to perform the method of one or more Aspects of Aspects 1-12.

Aspect 31: A non-transitory computer-readable medium storing code for wireless communication, the code comprising instructions executable by a processor to perform the method of one or more Aspects of Aspects 13-23.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 13-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   a memory; and
   one or more processors, coupled to the memory, configured to:
      receive a set of reference signals having different levels of power amplifier compression; and
      transmit a measurement report based at least in part on measurements of the set of reference signals.

2. The mobile station of claim 1, wherein the one or more processors, to receive the set of reference signals having different levels of power amplifier compression, are configured to:
   estimate kernels associated with determining power amplifier non-linearity for the different levels of power amplifier compression, or
   estimate coefficients of kernels associated with determining power amplifier non-linearity for the different levels of power amplifier compression.

3. The mobile station of claim 1, wherein the one or more processors, to receive the set of reference signals having different levels of power amplifier compression, are configured to:
   determine one or more of a precoding matrix indicator (PMI), a rank indicator (RI), or channel quality information (CQI) for reference signals of the set of reference signals,
      wherein the measurement report indicates one or more of the PMI, the RI, or the CQI for the reference signals of the set of reference signals.

4. The mobile station of claim 1, wherein the one or more processors are further configured to:
   receive an indication of a power amplifier compression to be used for one or more downlink communications,
      wherein the power amplifier compression is based at least in part on the measurement report.

5. The mobile station of claim 4, wherein the one or more processors, to receive the indication of the power amplifier compression to be used for the one or more downlink communications, are configured to:
   receive the indication of the power amplifier compression to be used for the one or more downlink communications via one or more of downlink control information or a medium access control element.

6. The mobile station of claim 1, wherein the one or more processors are further configured to:
   transmit an indication of one or more candidate levels of amplifier compression for selection by a base station.

7. The mobile station of claim 6, wherein the indication of the one or more candidate levels of amplifier compression comprises:
   an indication of one or more reference signals of the set of reference signals having levels of power amplifier compression that are preferred for one or more downlink communications.

8. The mobile station of claim 7, wherein the levels of power amplifier compression that are preferred are preferred based at least in part on one or more of:
   available computing resources of the mobile station,
   available power resources of the mobile station, or
   channel conditions.

9. The mobile station of claim 1, wherein the one or more processors are further configured to:
   transmit an indication of a capability to receive the set of reference signals having different levels of power amplifier compression.

10. The mobile station of claim 1, wherein the one or more processors, to receive the set of reference signals having different levels of power amplifier compression, are configured to:
    receive the set of reference signals having different levels of power amplifier compression periodically or aperiodically.

11. The mobile station of claim 1, wherein the one or more processors are further configured to:
    receive an additional set of reference signals having different levels of power amplifier compression based at least in part on one or more of:
       a change of channel conditions that satisfies a threshold amount of change,
       a mobility of the mobile station that satisfies a threshold amount of mobility, or
       a temperature change of the mobile station that satisfies a threshold amount of temperature change.

12. The mobile station of claim 1, wherein the one or more processors are further configured to:
    transmit a request to change a level of power amplifier compression used for one or more downlink communications.

13. A method of wireless communication performed by a mobile station, comprising:
    receiving, by the mobile station, a set of reference signals having different levels of power amplifier compression; and
    transmitting, by the mobile station, a measurement report based at least in part on measurements of the set of reference signals.

14. The method of claim 13, wherein receiving the set of reference signals having different levels of power amplifier compression comprises one or more of:
    estimating kernels associated with determining power amplifier non-linearity for the different levels of power amplifier compression, or
    estimating coefficients of kernels associated with determining power amplifier non-linearity for the different levels of power amplifier compression.

15. The method of claim 13, wherein receiving the set of reference signals having different levels of power amplifier compression comprises:
    determining one or more of a precoding matrix indicator (PMI), a rank indicator (RI), or channel quality information (CQI) for reference signals of the set of reference signals,
       wherein the measurement report indicates one or more of the PMI, the RI, or the CQI for the reference signals of the set of reference signals.

16. The method of claim 13, further comprising:
    receiving an indication of a power amplifier compression to be used for one or more downlink communications,
       wherein the power amplifier compression is based at least in part on the measurement report.

17. The method of claim 16, wherein receiving the indication of the power amplifier compression to be used for the one or more downlink communications comprises:
    receiving the indication of the power amplifier compression to be used for the one or more downlink communications via one or more of downlink control information or a medium access control element.

18. The method of claim 13, further comprising:
   transmitting an indication of one or more candidate levels of amplifier compression for selection by a base station.

19. The method of claim 18, wherein the indication of the one or more candidate levels of amplifier compression comprises:
   an indication of one or more reference signals of the set of reference signals having levels of power amplifier compression that are preferred for one or more downlink communications.

20. The method of claim 19, wherein the levels of power amplifier compression that are preferred are preferred based at least in part on one or more of:
   available computing resources of the mobile station,
   available power resources of the mobile station, or
   channel conditions.

21. The method of claim 13, further comprising:
   transmitting an indication of a capability to receive the set of reference signals having different levels of power amplifier compression.

22. The method of claim 13, wherein receiving the set of reference signals having different levels of power amplifier compression comprises:
   receiving the set of reference signals having different levels of power amplifier compression periodically or aperiodically.

23. The method of claim 13, further comprising:
   receiving an additional set of reference signals having different levels of power amplifier compression based at least in part on one or more of:
      a change of channel conditions that satisfies a threshold amount of change,
      a mobility of the mobile station that satisfies a threshold amount of mobility, or
      a temperature change of the mobile station that satisfies a threshold amount of temperature change.

24. The method of claim 13, further comprising:
   transmitting a request to change a level of power amplifier compression used for one or more downlink communications.

25. A non-transitory computer-readable medium storing a set of instructions for wireless communication, the set of instructions comprising:
   one or more instructions that, when executed by one or more processors of a mobile station, cause the mobile station to:
      receive a set of reference signals having different levels of power amplifier compression; and
      transmit a measurement report based at least in part on measurements of the set of reference signals.

26. The non-transitory computer-readable medium of claim 25, wherein the one or more instructions, that cause the mobile station to receive the set of reference signals having different levels of power amplifier compression, cause the mobile station to:
   estimate kernels associated with determining power amplifier non-linearity for the different levels of power amplifier compression, or
   estimate coefficients of kernels associated with determining power amplifier non-linearity for the different levels of power amplifier compression.

27. The non-transitory computer-readable medium of claim 25, wherein the one or more instructions, that cause the mobile station to receive the set of reference signals having different levels of power amplifier compression, cause the mobile station to:
   determine one or more of a precoding matrix indicator (PMI), a rank indicator (RI), or channel quality information (CQI) for reference signals of the set of reference signals,
      wherein the measurement report indicates one or more of the PMI, the RI, or the CQI for the reference signals of the set of reference signals.

28. An apparatus for wireless communication, comprising:
   means for receiving a set of reference signals having different levels of power amplifier compression; and
   means for transmitting a measurement report based at least in part on measurements of the set of reference signals.

29. The apparatus of claim 28, wherein the means for receiving the set of reference signals having different levels of power amplifier compression comprises one or more of:
   means for estimating kernels associated with determining power amplifier non-linearity for the different levels of power amplifier compression, or
   means for estimating coefficients of kernels associated with determining power amplifier non-linearity for the different levels of power amplifier compression.

30. The apparatus of claim 28, wherein the means for receiving the set of reference signals having different levels of power amplifier compression comprises:
   means for determining one or more of a precoding matrix indicator (PMI), a rank indicator (RI), or channel quality information (CQI) for reference signals of the set of reference signals,
      wherein the measurement report indicates one or more of the PMI, the RI, or the CQI for the reference signals of the set of reference signals.

* * * * *